UNITED STATES PATENT OFFICE.

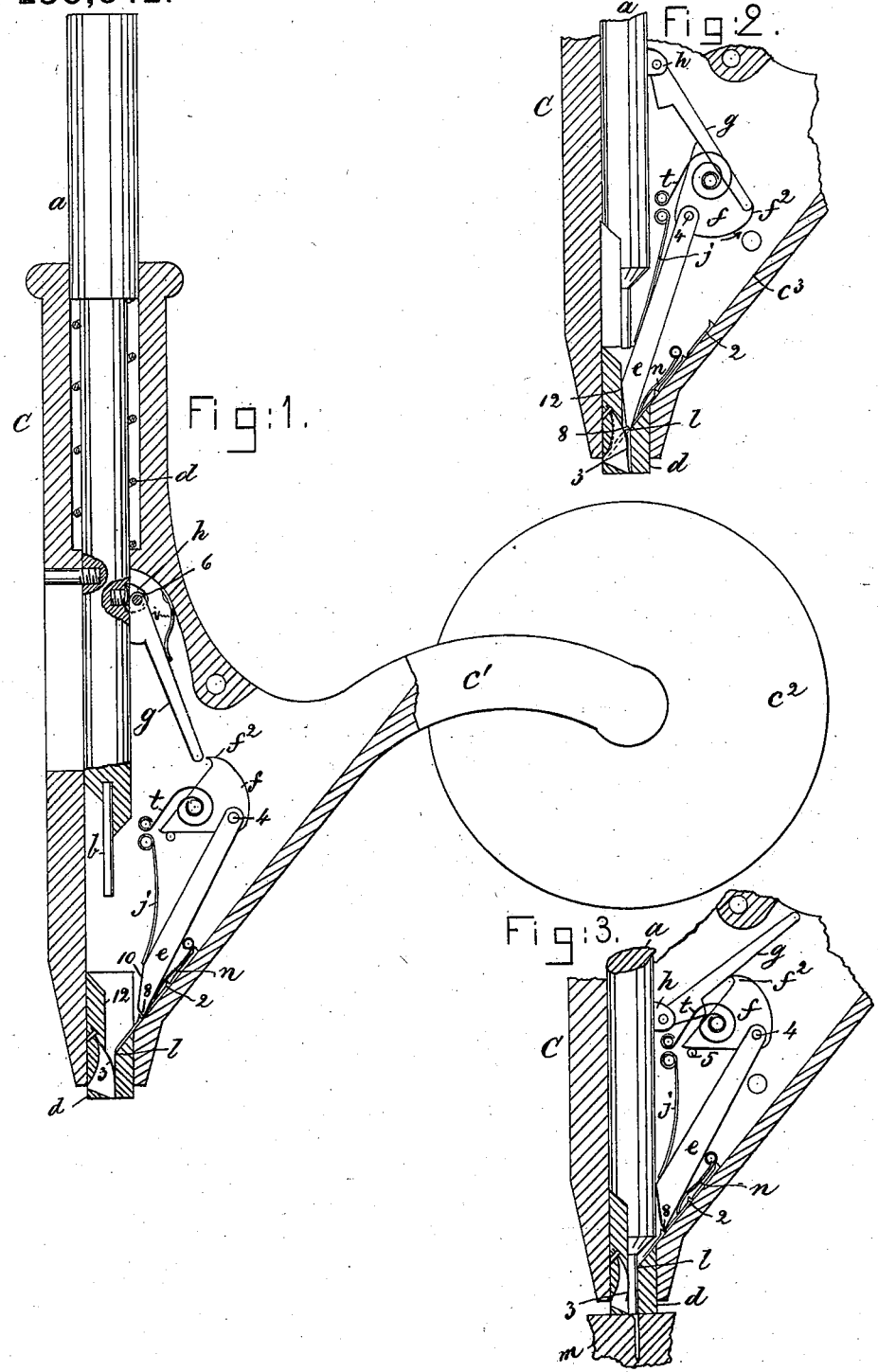

GORDON McKAY, OF CAMBRIDGE, AND WILLIAM L. TOBEY, OF LAWRENCE, MASSACHUSETTS, ASSIGNORS TO GORDON McKAY, TRUSTEE.

NAILING-MACHINE.

SPECIFICATION forming part of Letters Patent No. 230,642, dated August 3, 1880.

Application filed June 7, 1880. (No model.)

*To all whom it may concern:*

Be it known that we, GORDON MCKAY, of Cambridge, Middlesex county, and WILLIAM L. TOBEY, of Lawrence, Essex county, State of Massachusetts, have invented an Improvement in Nailing-Machines, (Case C,) of which the following description, in connection with the accompanying drawings, is a specification.

This invention relates to nailing-machines chiefly for use in connection with boot and shoe or leather work; and our invention consists, essentially, in the combination, with the driver-bar, of a feeding mechanism adapted to both feed forward the nail-string and cut the nail from the string during the descent of the driver.

Figure 1 represents, in vertical section and partial side elevation, a nailing-machine provided with our improvements; Fig. 2, a sectional detail, showing the feeder in the position it will occupy just as the nail has been cut from the string of nails, the driver having been driven partially down; and Fig. 3, a similar detail, showing the driver fully down.

The frame C of the machine contains the driver-bar $a$, having connected with it the driver $b$ and the spring $d$, to lift the driver-bar, all as usual.

The ears $c'$ of the frame support the usual reel, upon which is wound the usual nail-string. The drawings show at 2 a short piece of the nail-string resting on the surface $c^3$.

The nose $d$ has at one side of it a recess to receive within it the nail-controller 3, such as described in another application for United States patent for nailing mechanism filed by us concurrently with this, and to which reference may be had, the said nail-controller bending the endmost nail of the string down into the nose-passage, with its axis in the line of the driver, as in the said application, and as shown in Fig. 2.

The feeder $e$ for the string-nails (it also acting as a cutter for the said string-nails) is herein shown as pivoted at 4 on a vibrating block, $f$, pivoted at 5. This block $f$ is notched or provided with a projection, $f^2$, against which strikes the free or lower end of the finger $g$, pivoted at 6 upon an ear or lug, $h$, screwed into the driver-bar. (See Fig. 1.)

This finger is acted upon at one side by a spring, $i$, and the feeder by a spring, $j$. The tendency of the spring $i$ is to keep the finger pressed toward the driver-bar, and of the spring $j$ to keep the feeder down upon the nail-string.

The driver-bar, Fig. 1, is shown in its highest position, and as it descends the finger $g$ meets the projection $f^2$ of the vibrating block $f$, and turns the same into the position of Fig. 2, causing the feeder $e$, during such movement, to move the nail in advance of its end across the driver-passage into the position shown in dotted lines, Fig. 2, and against the nail-controller or spring 3, which, as soon as the nail-head passes beyond the corner $l$ of the nose, which corner is hard enough to serve as one member of the cutters, acts to bend the said nail down into the full-line position in Fig. 2.

Just before or as the feeder $e$ reaches its most forward position the cutting end 8 passes downward toward and over the said corner $l$ and severs the nail between them.

One part of the feeder is beveled, as at 10, to act upon the surface 12 of the nose and cause the cutter part 8 of the feeder to approach the string-nail and corner $l$ at the proper angle to insure a correct cut.

As the driver-bar further descends below the position in Fig. 2 the finger $g$, by its action on the flat edge of the vibrating block, against which it is kept pressed by the spring $i$, releases the said block. The spiral or other spring $t$ turns the block in the direction of the arrow near it, (see Fig. 2,) until the block and finger, during the further descent of the driver, turns into the position shown in Fig. 3. The driver by that time having met and driven into the material the nail just before cut off by the feeder. As the spring $t$ turns the block $f$ backward in the direction of the said arrow the feeder is drawn back positively.

The detent-spring $n$ rests upon and holds a nail of the string back of the nail which is to be next struck by the driver while the string of nails is so held. This is not of our invention, but belongs to Hadley P. Fairfield.

We do not desire to limit our invention to the exact devices shown to actuate the feeder and cause it to cut the string-nails as the driver descends, as we may have other equivalent connecting means between it and the driver-bar.

The controller need not be stiff enough to turn the nail back until after it is cut off.

We claim—

1. In a nailing-machine, the driver-bar, combined with the one-piece feeder and cutter $e$, to feed and sever the string-nails, as set forth, and with means, substantially as described, between it and the driver-bar, whereby the said feeder $e$ is made to feed the string of nails forward and then sever a nail from the string at each descent of the driver-bar and driver, substantially as described.

2. The driver-bar and the finger $g$, pivoted thereon, combined with the feeder $e$ and the vibrating block $f$, to operate substantially as described.

In testimony whereof we have signed our names to this specification in the presence of two subscribing witnesses.

GORDON McKAY.
WM. L. TOBEY.

Witnesses:
G. W. GREGORY,
L. F. CONNOR.